No. 750,138. PATENTED JAN. 19, 1904.
D. WASHINGTON.
COTTON CHOPPER.
APPLICATION FILED OCT. 17, 1902.
NO MODEL. 3 SHEETS—SHEET 2.

Witnesses
E. G. McKee
B. P. Funk

Inventor
David Washington
By Victor J. Evans
Attorney

No. 750,138. PATENTED JAN. 19, 1904.
D. WASHINGTON.
COTTON CHOPPER.
APPLICATION FILED OCT. 17, 1902.
NO MODEL. 3 SHEETS—SHEET 3.
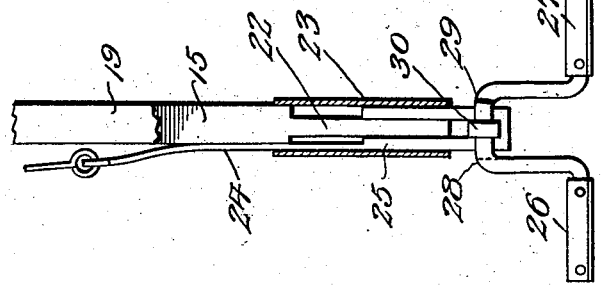
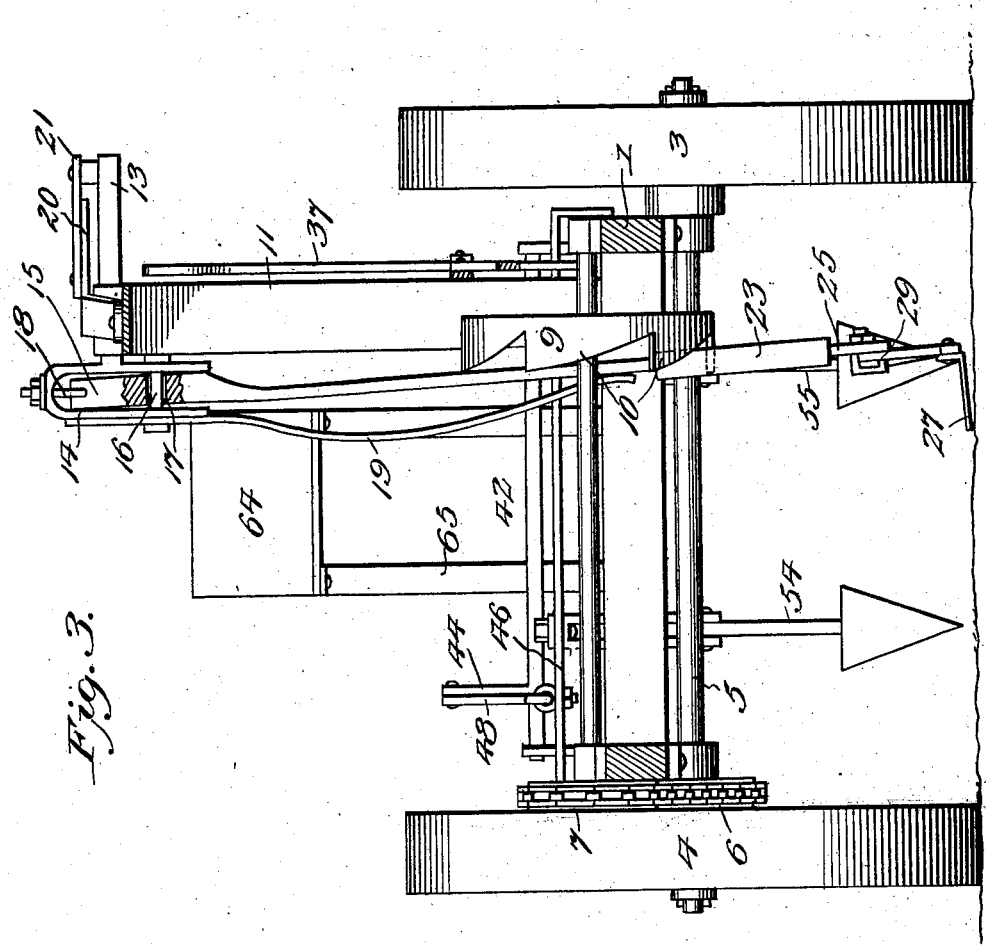
Witnesses
E. G. McKee
B. F. Funk
Inventor
David Washington
By Victor J. Evans
Attorney No. 750,138. Patented January 19, 1904.

UNITED STATES PATENT OFFICE.

DAVID WASHINGTON, OF RUSK, TEXAS, ASSIGNOR OF TWO-THIRDS TO JUAN NAVARRETE AND ALLEN MATHEWS, OF RUSK, TEXAS.

COTTON-CHOPPER.

SPECIFICATION forming part of Letters Patent No. 750,138, dated January 19, 1904.

Application filed October 17, 1902. Serial No. 127,703. (No model.)

*To all whom it may concern:*

Be it known that I, DAVID WASHINGTON, a citizen of the United States, residing at Rusk, in the county of Cherokee and State of Texas, have invented new and useful Improvements in Cotton-Choppers, of which the following is a specification.

This invention relates to cotton-choppers, and has for its object to provide a simple and efficient means for cultivating the cotton in rows.

In order to appreciate the novel features of construction embodied in this device, reference must be had to the following description, in connection with the accompanying drawings, in which—

Figure 1:
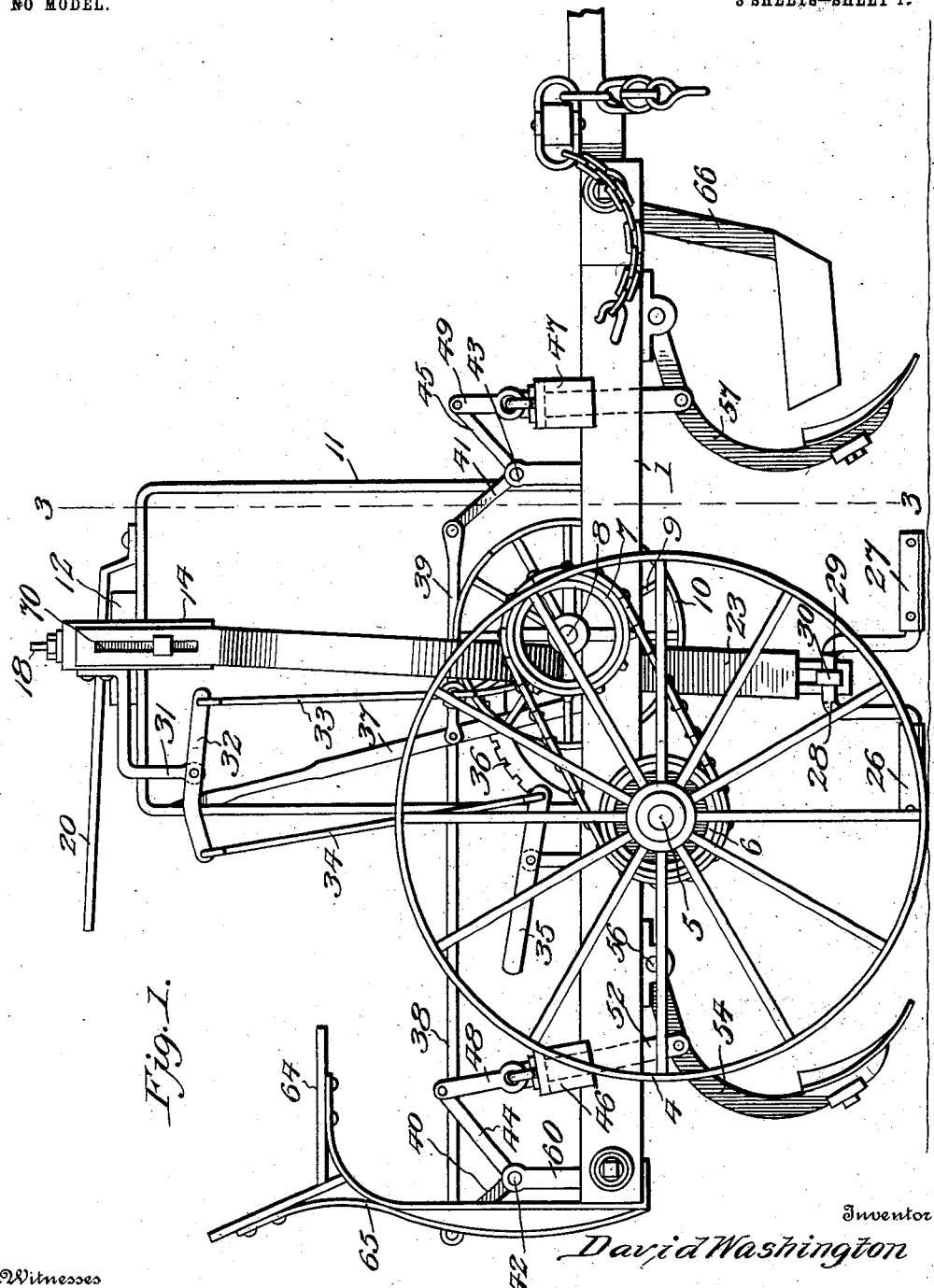
Figure 2:
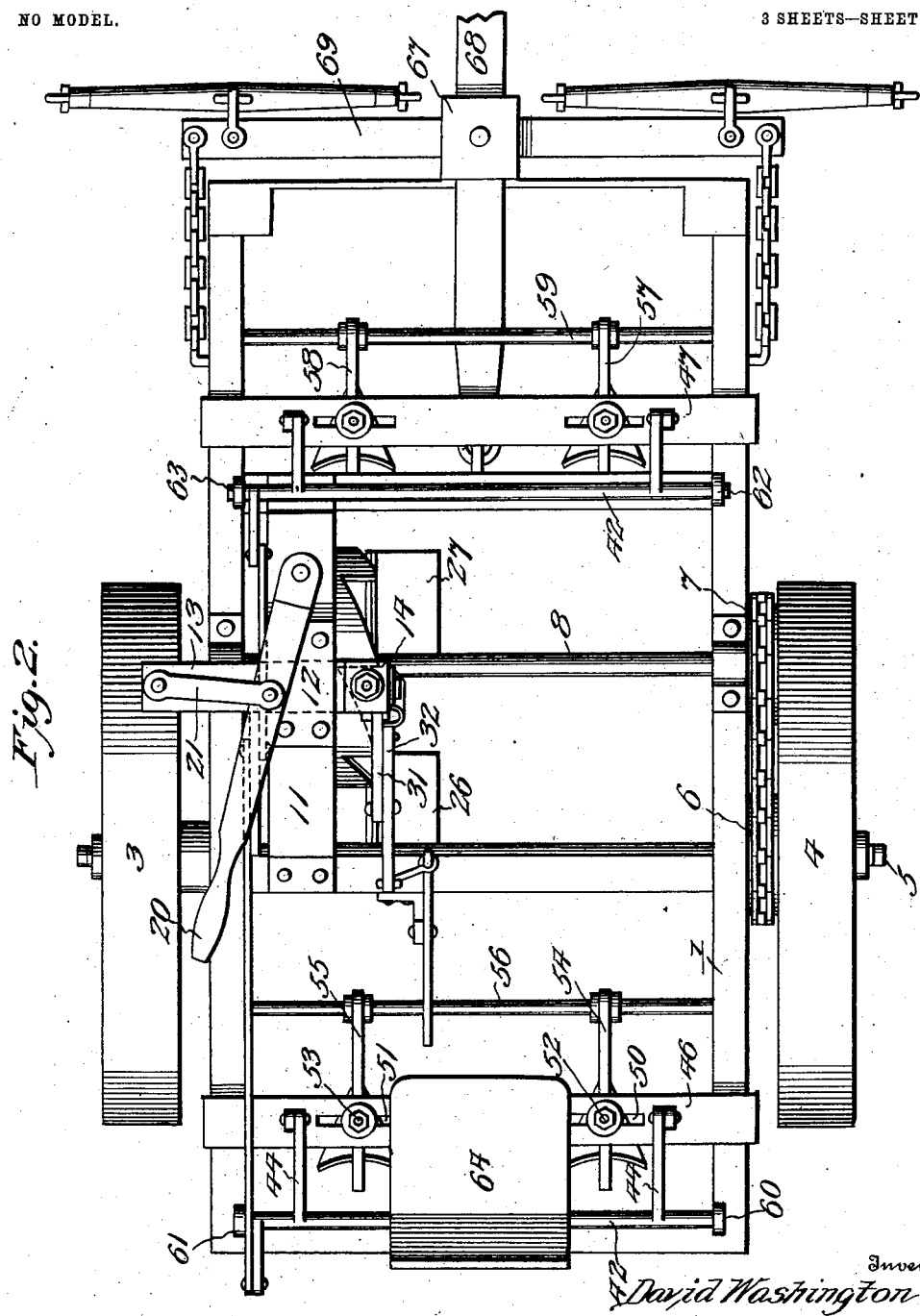

Figure 1 is a side elevation of a cotton-chopper constructed in accordance with my invention. Fig. 2 is a top plan view of the cotton-chopper. Fig. 3 is a cross-sectional view on the line 3 3 of Fig. 1. Fig. 4 is a detail view of the hoe-handle and hoes, the sleeve for holding the hoe to the handle being shown in section.

The reference-numeral 1 designates an approximately rectangular frame supported by traction-wheels 3 and 4, which turn on the axle 5, running transversely of the frame. Formed integral with the hub of one of the wheels is a sprocket 6, connected to a similar sprocket 7 on a transverse shaft 8, which is secured to the top of the frame 1 and carries near the end opposite to the sprocket 7 a cam-wheel 9, the inner edge of which is provided with a plurality of cam-teeth 10.

11 designates a vertically-arranged U-shaped frame which is provided at its top with a slotted block 12. Slidably secured in the slot in the block is a transversely-arranged bar 13, on one end of which is an inverted-U-shaped bracket 14, in which is carried a vibrating hoe-handle 15. The handle is loosely mounted in the bracket by means of a laterally-arranged bolt 16, which projects through an opening 17 in the handle, the opening being of greater diameter than the bolt, so as to permit of sufficient play, whereby the handle can swing in a lateral direction. To the top of the handle is secured a U-bolt 18, so as to hold the upper edge of the opening 17 from contact with the bolt 16, and thereby reduce the friction.

On the outer edge of the bracket 14 and carried by one of the arms thereof is a flat spring 19, which has a depending end bearing against the handle of the hoe with sufficient tension to cause it to normally rest in contact with the teeth of the cam-wheel 9. However, the handle can be thrown out of contact with the teeth through the medium of a lever 20, which is pivoted to the top of the frame 11 and is connected to the free end of the sliding bar 13 by means of a link 21. Thus by grasping the handle of the lever 20 the bar 13 can be slid through the slot, thus carrying the handle out of contact with the teeth, so that the movement of the traction-wheels and sprockets which rotate the cam-wheel will not effect the movement of the handle. The lower portion of the handle is provided with a restricted extremity, (designated by the reference-numeral 22,) and surrounding this extremity is a sleeve or casing 23, having an opening near its top through which projects an extending end 24 of a sliding clevis 25, which is free to move vertical within the sleeve 23 and on the restricted end 22 of the hoe-handle 15. The clevis carries a pair of adjustable hoes, (designated by the reference-numerals 26 and 27, respectively,) and which are provided with overlapping shanks 28 and 29, which project through a U-bolt 30, extending through the clevis, whereby the shanks can be rigidly secured to the clevis in any determined adjustable relation to accommodate the hoes for destroying two stalks or more, or, if desired, one of the hoes can be removed where the cotton is bunched, so that the other wheel will not interfere with the proper manipulation of the remaining hoe with the earth. Projecting from one side of the U-shaped bracket 14 is an angular arm 31, to which is pivoted intermediate its ends a rocking lever 32, on one end of which is a link-rod 33, connected to the upper end of the extension 24 of the clevis 25. To the other end of the rocking lever 32 is a depending link 34, which is engaged at its lower extremity by a pivoted foot-lever 35. Thus by operating the lever 35 the clevis 25 can be slid vertically with relation to the hoe-handle, thus raising and lowering the hoes to their proper relative position with relation to the earth. If it is desirable to increase or diminish between the hoes 26 and 27, the shanks 28 and 29 can be slid upon each other, and when the proper adjustment has been obtained the U-bolt 30 may be manipulated to fasten the shanks rigid to the clevis 25. Thus it will be seen that the hoes are adjustable both vertically and laterally.

Secured to one of the side bars of the frame 1 is a segmental rack 36, adapted to be engaged by a pivoted lever 37, vertically arranged with relation to the frame. Pivotally secured to the lever 36 and extending in diametrically opposite directions are connecting-bars 38 and 39, which are in turn connected to cranks 40 and 41 of the rock-shafts 42 and 43, respectively. On the rock-shafts 42 and 43 are also cranks 44 and 45, which are connected to the slotted bars 46 and 47 by links 48 and 49. It will be observed that the transverse bars 46 and 47 are transversely arranged with relation to the frame and are at the rear and front of the machine, respectively.

Mounted in the slots 50 and 51 of the bar 46 are eyebolts 52 and 53, the eyes of which are secured to the plow-feet 54 and 55, pivoted to the shaft 56. These plows can be adjusted toward and away from the longitudinal center of the machine to accommodate the device to rows of different widths.

Arranged in the front of the machine are parallel plows 57 and 58, which are connected to a shaft 59 and are supported with relation to the bar 47 in substantially the same manner as the plows 54 and 55 in the rear of the machine. It will be apparent that by operating the lever 37 the plows can be adjusted or thrown into and out of engagement with the earth, and inasmuch as the forward ends of the feet are fulcrumed to the shafts 56 or 59 an upward pull on the bars 46 and 47 will tend to raise the plow-points.

The shaft 42 is journaled in standards 60 and 61, while the shaft 43 is journaled in standards 62 and 63, said standards being supported by the frame 1.

In order that the operator may conveniently control the parts of the machine and have them within easy reach, I provide a seat 64, supported on suitable spring-standards 65, carried by the rear of the frame 1.

Secured to the front of the frame 1 and running with the longitudinal center of the frame is a fender 66, which may be of any preferred construction. A draft device 67 is also connected to the frame and comprises a tongue 68 and the doubletree 69.

From the foregoing description it will be apparent that in transporting the machine from field to field or over unbroken ground the plows can readily be thrown out of contact with the earth through the medium of the lever 37, and by pushing the lever 20 from left to right the hoe-handle can be thrown out of contact with the cam-wheel 9. At the same time the operator can press down on the rear end of the lever 35, thus drawing the hoes upward and out of contact with the ground. By reversing the operation just described of course the parts will be thrown in relative operation.

By reference to Fig. 1 it will be noticed that the upper end of the spring 19 is provided with a longitudinally-arranged elongated slot 70, through which the bolt 16 projects, so that the spring can be adjusted vertically to decrease or increase the tension thereof on the hoe-handle 15.

While I have specifically described what to me at this time appears to be the very best means of accomplishing the desired result, I would have it understood that I do not limit myself to the exact details of construction shown, but reserve the right to make such slight changes and alterations as would suggest themselves from time to time without departing from the spirit of this invention or sacrificing any of the advantages thereof.

Having thus described the invention, what is claimed, and desired to be secured by Letters Patent, is—

1. In a cotton-chopper, the combination with a frame, of a revolving cam-wheel carried on the frame, a vibrating wheel suspended from the frame, a laterally-sliding bar to which the hoe-handle is secured, and a lever connected to the bar and adapted to move it so as to throw the hoe out of engagement with the cam-wheel.

2. In a cotton-chopper, the combination with a frame, of a revolving cam-wheel carried on the frame, a second frame provided with a slotted block, a transverse bar secured in the slot, a bracket on one end of the bar, a hoe-handle loosely mounted in the bracket, a spring secured at one end to the bracket and having its opposite end bearing against the hoe-handle, and means for drawing the hoe out of engagement with the cam-wheel.

3. In a cotton-chopper, the combination with a frame, of a revolving cam-wheel carried on the frame, a second frame provided with a slotted block, a transverse bar secured in the slot, a bracket on one end of the bar, a hoe-handle provided with an opening within the bracket, a bolt passing through the sides of the bracket and the opening in the hoe-handle, said bolt being of less diameter than the opening in the handle, a U-bolt secured to the top of the handle, means for exerting spring-pressure on the hoe-handle and means for drawing the hoe out of engagement with the cam-wheel.

4. In a cotton-chopper, the combination with a frame, of a vibrating hoe-handle carried thereby, the lower extremity of the handle being restricted, a sleeve having an opening near its top, surrounding the extremity, a clevis slidably mounted on the restricted end of the hoe-handle, an extension on the clevis passing through the opening in the sleeve, bars carried by the clevis, and connections between the free end of the extension of the clevis and a pivoted lever on the frame.

5. In a cotton-chopper, the combination with a frame, of a vibrating hoe-handle carried thereby, said handle being restricted at its lower extremity, a sleeve having an opening surrounding the extremity, a clevis free to move within the sleeve and on the restricted end of the handle, a U-shaped bolt on the clevis, and hoes having overlapping shanks extending through the U-shaped bolt on the clevis.

6. In a cotton-chopper, the combination with a frame, of a bracket superimposed above the frame, a bar leading from the bracket and slidably secured with relation to the frame, a vibrating hoe-handle carried in the bracket, a vibrating device for actuating the hoe-handle, and a lever connected to the bar for throwing the hoe-bar out of engagement with the vibrating device.

7. In a cotton-chopper the combination with a frame, of a vibrating hoe-handle carried thereby and a pair of vertically and laterally adjustable hoes carried by the handle.

8. In a cotton-chopper the combination with a frame, of a sliding bar supported on the frame, a depending hoe-handle pivotally carried by the bar, means for imparting a vibratory motion to the hoe-handle and means for sliding the bar so as to cause the hoe-handle to be thrown into and out of contact with the first-named means.

In testimony whereof I affix my signature in presence of two witnesses.

DAVID WASHINGTON.

Witnesses:
JOE WILKERSON,
W. P. ARDREY.